J. T. Vaughn,
Peach-Cutter.

No. 86,045. Patented Jan. 12. 1869

Witnesses:

Inventor:
J. T. Vaughn
Per Munn & Co
Attorneys

JOHN T. VAUGHN, OF GRIFFIN, GEORGIA.

Letters Patent No. 86,045, dated January 19, 1869.

IMPROVED PEACH-CUTTER.

The Schedule referred to in these Letters Patent and making part of the same.

*To all whom it may concern:*

Be it known that I, JOHN T. VAUGHN, of Griffin, in the county of Spaulding, and State of Georgia, have invented a new and useful Improvement in Peach-Cutter; and I do hereby declare that the following is a full, clear, and exact description thereof, which will enable those skilled in the art to make and use the same, reference being had to the accompanying drawings, forming part of this specification.

This invention relates to a new and useful improvement in an implement for cutting peaches, whereby peaches of different sizes, or containing different-sized pits, may be pitted and sliced by a single motion; and The invention consists in an expansible, elastic central tube, having vertically-arranged wings or cutters attached thereto, which, in number, may be three, (more or less,) which wings are supported by an elastic circular cutter, as will be hereinafter more fully described.

Figure 1:
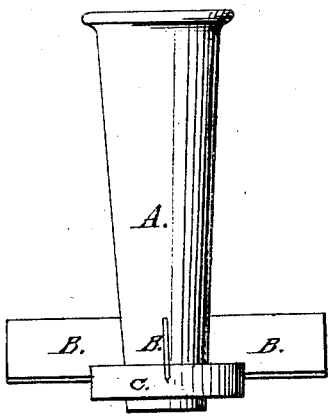
Figure 2:
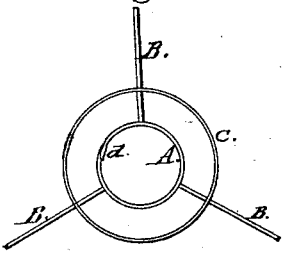

Figure 1 is a longitudinal side view of the implement.
Figure 2 is a view of the cutting-end.

Similar letters of reference indicate corresponding parts.

A is a central tube, which is somewhat tapering in form, and of any desired length, with cutters attached near its small end, as seen in the drawing.

B represents the straight cutters, which radiate from the tube A.

C represents the circular cutter, the back of which rests in slots in each of the cutters B, or which may be attached in any other suitable manner.

The cutters B are rigidly attached to the tube A.

In using the cutter, it is pressed down on to the peach, and the pit passes up the tube, while the peach would (in this example of my invention) be cut into six pieces.

The circular cutter C may be dispensed with altogether, when it is not desired to cut the peaches fine, or to support the cutters B.

For the purpose of adapting the cutter to different-sized pits, I cut the tube A, or allow the edges to lap by each other, as seen at *d* in the drawing.

The circular cutter C is formed in the same manner, so that it will expand, and thereby allow the tube to expand.

By thus making the cutter-tube and circular cutter expansible, the peaches are worked up much more economically than they would be if the tube were rigid, and sufficiently large to receive the largest pits.

I claim as new, and desire to secure by Letters Patent—

The combination of the central expansible tube A with the cutting-wings B and circular cutter C, substantially as described, for the purpose specified.

JOHN T. VAUGHN.

Witnesses:
C. P. VAUGHN,
WM. H. VAUGHN.